United States Patent [19]
Sacripante et al.

[11] Patent Number: 5,747,554
[45] Date of Patent: May 5, 1998

[54] INK COMPOSITIONS

[75] Inventors: Guerino G. Sacripante, Oakville; Fatima M. Pontes, Mississauga; Stephan V. Drappel; Daniel A. Foucher, both of Toronto; Marcel P. Breton, Mississauga, all of Canada

[73] Assignee: Xerox Corporation, Stamford, Conn.

[21] Appl. No.: 624,273

[22] Filed: Mar. 29, 1996

[51] Int. Cl.$^6$ ............................................. C09D 5/00
[52] U.S. Cl. ................................................ 523/161; 8/647
[58] Field of Search ........................ 8/647; 523/161; 106/31.13

[56] References Cited

U.S. PATENT DOCUMENTS

| | | | |
|---|---|---|---|
| 4,459,130 | 7/1984 | Helling et al. | 8/554 |
| 4,490,731 | 12/1984 | Vaught | 346/140 R |
| 4,751,528 | 6/1988 | Spehrley, Jr. et al. | 346/140 R |
| 5,006,170 | 4/1991 | Schwarz | 106/20 |
| 5,041,161 | 8/1991 | Cooke et al. | 106/22 |
| 5,121,141 | 6/1992 | Hadimoglu et al. | 346/140 R |
| 5,176,745 | 1/1993 | Moore et al. | 106/22 R |

*Primary Examiner*—Edward J. Cain
*Attorney, Agent, or Firm*—E. O. Palazzo

[57] ABSTRACT

An ink composition comprised of a polyesterified-dye (I) or polyurethane-dye (II) with a viscosity of from about 3 centipoise to about 20 centipoise at a temperature of from about 125° C. to about 165° C. and represented by the formulas

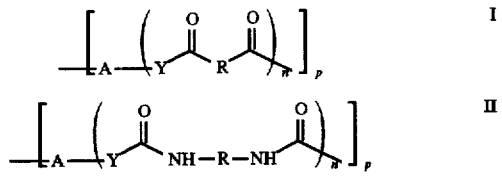

wherein A is an organic chromophore, Y is an oxyalkylene or poly(oxyalkylene), R is an arylene or alkylene, n represents the number of repeating segments, and is an integer of from about 2 to about 50, and p represents the number of chains per chromophore and is an integer of from about 1 to about 6.

22 Claims, No Drawings

INK COMPOSITIONS

BACKGROUND OF THE INVENTION

The present invention is directed to ink compositions, and more specifically, the present invention relates to hot melt inks especially useful for acoustic ink printing, processes and apparatuses, reference for example copending patent applications and patents U.S. Pat. No. 5,121,141, U.S. Pat. No. 5,111,220, U.S. Pat. No. 5,128,726, U.S. Pat. No. 5,371,53, U.S. Ser. No. 176,381, now abandoned U.S. Ser. No. 285,572, U.S. Pat. No. 5,528,384 the disclosures of which are totally incorporated herein by reference, including especially acoustic ink processes as illustrated in some of the aforementioned copending applications and patents, such as an acoustic ink printer for printing images on a record medium.

More specifically, the present invention is directed to hot melt acoustic ink compositions wherein there can be generated with such inks excellent developed images with acceptable image permanence, excellent projection efficiency on transparencies without a post fusing step, and excellent crease resistance, and wherein the inks possess acceptable, and in embodiments superior lightfastness, and superior waterfastness. Moreover, in embodiments of the present invention, there are provided inks that enable the elimination, or minimization of undesirable paper curl since water is not present, or very small amounts thereof are selected in the invention inks. With the inks of the present invention, it is preferred that there be an absence of water, and since water is not present in the inks a dryer can be avoided thereby minimizing the cost of the acoustic ink jet apparatus and process. The inks of the present invention in embodiments thereof are comprised of a colored vehicle and optionally a noncolored vehicle, reference, U.S. Pat. Nos. 5,688,312; 5,667,568 and 5,700,316, the disclosures of each application being incorporated herein by reference; and more specifically, wherein the colored vehicle is comprised of a vehicle chemically bound to the colorant, such as a dye, and more specifically, a functionalized dye, such as a polyoxyalkylene substituted organic chromophore. More specifically, the aforementioned colored vehicle is comprised of a dye chromophore chemically attached to a vehicle such as a polyesterified-dye (I) or polyurethane-dye (II) as illustrated by the formulas:

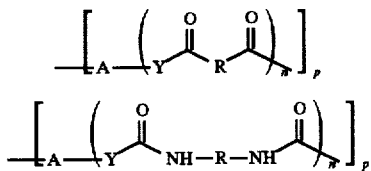

wherein A is an organic chromophore; R is an alkylene group with, for example, from 2 to about 50 carbon atoms, and preferably from 2 to about 25 carbon atoms, or arylene with, for example, from about 7 to about 24 carbon atoms; Y is an oxyalkylene or poly(oxyalkylene) group; n represents the number of repeating segments and is an integer of from about 1 to about 50; and p represents the number of chains per chromophore and is an integer of from about 1 to 6, and preferably from about 1 to 4. Examples of the A chromophore include nitroso, nitro, azo, diarylmethane, triarylmethane, xanthane, acridine, quinoline, methine, thiazole, indamine, indophenol, lactone, aminoketone, hydroxyketone, stilbene, azine, oxazine, thiazine, anthroquinone, phthalocyanine, and perylenes as well as alkali sulfo or alkali carboxylic derivatives of the aforementioned chromophores. Examples of oxyalkylene include ethylene glycol, diethylene glycol, triethylene glycol, propylene glycol, dipropylene glycol and the poly(oxyalkylene) includes polyethylene oxide, polypropylene oxide and the like. Examples of R include, phenylene, toluene, benzylene, ethylene, propylene, butylene, hexylene, decylene, dodecylene and the like. The A chromophore is present in various effective amounts, such as for example from about 2 to 10 percent by weight of the polyesterified-dye or polyurethane-dye, and preferably from about 3 to 7 percent by weight of the polyesterified-dye or polyurethane-dye, and the chains per chromophore "p" are present in an amount of from about 90 to about 98 percent by weight of the polyesterified-dye or polyurethane-dye. The aforementioned colored vehicle (the color is the chromophore and the vehicle it is bound to is the polyester or polyurethane segment) is present in various effective amounts, such as from about 10 to about 100 percent by weight, of the ink.

The optional noncolored vehicle which can be present in various effective amounts, such as from about 0 to about 90 percent of the ink includes a hydrazine, cyclic amines, ureas, carboxylic acids, sulfonic acids, aldehydes, ketones, hydrocarbons, esters, phenols, amides, imides, halocarbons, urethanes, ethers, sulfones, sulfamides, sulfonamides, phosphites, phosphonates, phosphates, alkyl sulfides, alkyl acetates, and sulfur dioxide, and preferably an organo imide, bisimide, bisamide, poly-(alkylene oxide)alkylate, poly-(alkylene oxide)-dialkylate, polyoxa-alkanoic ester or a polyoxa-alkanedioic ester, and the like, reference U.S. Pat. Nos. 5,688,312; 5,667,568 and, 5,700,316, the disclosures of each application being incorporated herein by reference.

In acoustic ink printing, the printhead produces approximately 2.2 picoliter droplets by an acoustic energy process. The ink under these conditions should display a melt viscosity of about 25 centipoise or less at the jetting temperature. Furthermore, once the ink is jetted onto the paper, the ink image is to be of excellent crease property, nonsmearing waterfast, of excellent transparency and excellent fix qualities. In selecting an ink for such applications, it is desirable that the vehicle display low melt viscosity, such as from about 1 centipoise to about 10 centipoise in the acoustic head, while also displaying solid-like properties after being jetted onto paper. Since the acoustic head can tolerate a temperature up to about 180° C., and preferably up to a temperature of from about 140° C. to about 160° C., the vehicle for the ink should display liquid-like properties, such as a viscosity of 1 to about 10 centipoise at a temperature of from about 125° to about 165° C., and solidify or harden after jetting onto paper such that the ink displays a hardness value of from about than 0.1 to 0.5 millimeter utilizing a pentrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is selected to have a melting point above room temperature so that the ink which is melted in the apparatus will not be subject to evaporation or spillage during periods of nonprinting. The vehicle is also chosen to have a low critical temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Hot melt ink jets are somewhat similar to thermal ink jets, however, a hot melt ink contains no solvent. Thus, rather than being liquid at room temperature, a hot melt ink is typically a solid or semi-solid having a wax-like consistency. These inks usually, thus as indicated herein, need to be heated to approximately 100° C. before the ink melts and converts into a liquid. A plurality of ink jet nozzles are provided in a printhead for acoustic ink jet apparatuses. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to remove moisture from the ink fast enough so that the ink does not soak into a plain paper medium. This is particularly the situation when printing with color. Therefore, usually when printing with thermal in, one needed to use coated papers, which are more expensive than plain paper.

One advantage of a hot melt ink jet is its ability to print on plain paper since the hot melt ink quickly solidifies as it cools and, since it is waxy in nature, and does not normally soak into a paper medium. However, hot melt ink jets can be cumbersome in structure and in design, for example, the associated integrated electronics of a thermal ink jet head are considerably more compact than those of a hot melt ink jet head.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially nonheat conducting reservoir housing. The reservoir system has a sloping flow path between an inlet position and a sump from which ink is drawn to the head, and includes a plurality of vanes situated upon the plate for rapid heat transfer.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose hot melt ink compositions suitable for ink jet printing which comprise a colorant, a binder, and a propellant selected from the group consisting of hydrazine, cyclic amines, ureas, carboxylic acids, sulfonic acids, aldehydes, ketones, hydrocarbons, esters, phenols, amides, imides, halocarbons, urethanes, ethers, sulfones, sulfamides, sulfonamides, phosphites, phosphonates, phosphates, alkyl sulfides, alkyl acetates, and sulfur dioxide. Also disclosed are hot melt ink compositions suitable for ink jet printing which comprise a colorant, a propellant, and a binder selected from the group consisting of rosin esters, polyamides, dimer acid amides, fatty acid amides, epoxy resins, fluid paraffin waxes, fluid microcrystalline waxes, Fischer-Tropsch waxes, polyvinyl alcohol resins, polyols, cellulose esters, cellulose ethers, polyvinyl pyridine resins, fatty acids, fatty acid esters, polysulfonamides, benzoate esters, long chain alcohols, phthalate plasticizers, citrate plasticizers, maleate plasticizers, sulfones, polyvinyl pyrrolidinone copolymers, polyvinyl pyrrolidone/polyvinyl acetate copolymers, novalac resins, natural product waxes, mixtures of linear primary alcohols and linear long chain amides; and mixtures of linear primary alcohols and fatty acid amides. In one embodiment, the binder comprises a liquid crystalline material. The inks of the present invention are dissimilar than the aforementioned '179 and '187 in that, for example, the invention vehicle selected displays a viscosity of from about 1 to about 10 centipoise when heated to a temperature of from about 125° C. to about 165° C., thereby enabling, for example, acoustic energy in the printhead to eject an ink droplet onto paper. Additionally, the inks of the present invention display softening points of from about 50° C. to about 100° C. Furthermore, the formulas of the polyesterified-dye (I) or polyurethane-dye (II) of these invention inks also differ and are not disclosed or suggested, it is believed, from the aforementioned '170 or '187 patents.

U.S. Pat. Nos. 4,507,407 and 5,310,887, the disclosures of which are totally incorporated herein by reference, illustrate functionalized dyes comprised of a chromophore with a polyoxyalkylene substituent.

U.S. Pat. No. 5,021,802, the disclosure of which is totally incorporated herein by reference, illustrates a bubble jet ink which comprises 90 to 99.9 percent by weight of aqueous sol gel medium and 0.1 to 1 percent by weight of colorant. The inks are thermally reversible sol gels which are gels at ambient temperatures and form liquid sols at temperatures between about 40° C. and 100° C.

U.S. Pat. 5,041,161, the disclosure of which is totally incorporated herein by reference, discloses an ink jet ink which is semi-solid at room temperature. The ink combines the advantageous properties of thermal phase change inks and liquid inks. The inks comprise vehicles, such as glyceryl esters, polyoxyethylene esters, waxes, fatty acids, and mixtures thereof, which are semi-solid at temperatures between 20° C. and 45° C. The ink is impulse jetted at an elevated temperature in the range of about 45° C. to about 110° C., at which temperature the ink has a viscosity of about 10 to 15 centipoise. The inks also contain 0.1 to 30 weight percent of a colorant system.

U.S. Pat. No. 4,853,036 and U.S. Pat. No. 5,124,718 disclose an ink for ink jet recording which comprises a liquid composition essentially comprising a coloring matter, a volatile solvent having a vapor pressure of 1 millimeter Hg or more at 25° C., and a material being solid at room temperature and having a molecular weight of 300 or more, and prepared so as to satisfy the formula $B_1/A_1 \geq 3$, assuming viscosity as $A_1$ cP at 25° C., measured when the content of the solid material in the composition is 10 percent by weight, and assuming viscosity as $B_1$ cP at 25° C., measured when the content of the solid material in the composition is 30 percent by weight. An ink jet recording process using the ink is also disclosed.

U.S. Pat. No. 5,065,167, the disclosure of which is totally incorporated herein by reference, discloses an ink jet ink including a waxy carrier that is solid at 25° C. and liquid at the operating temperature of an ink jet nozzle and a driver having a critical pressure greater than 10 atmospheres, the carrier and driver being miscible in liquid phase.

U.S. Pat. No. 5,047,084, the disclosure of which is totally incorporated herein by reference, discloses an ink jet ink in the form of a microemulsion of an organic vehicle phase comprising fatty acid and colorant dispersed therein, and an aqueous phase containing a surfactant, the vehicle phase preferably being liquid at 70° C. and solid at 20° C.

U.S. Pat. No. 5,226,957, the disclosure of which is totally incorporated herein by reference, discloses water insoluble dyes formulated in a microemulsion-based ink which is waterfast, nonthreading, and bleed-alleviated. The inks comprise (a) about 0.05 to 0.75 weight percent of a high molecular weight colloid, (b) about 0.1 to 40 weight percent of at least two surfactants comprising at least one surfactant and at least one cosurfactant, (c) about 0.5 to 20 weight percent of at least one cosolvent, (d) about 0.1 to 5 weight percent of at least one water insoluble dye, (e) about 0.1 to 20 weight percent of an oil, and (f) the balance water. The ink forms a stable microemulsion.

"A Hot Melt Ink for Thermal Jet Printing", A. H. Sporer et al., *Journal of Imaging Science and Technology*, Vol. 36, No. 2, page 176 (March/April 1992), the disclosure of which is totally incorporated herein by reference, discloses an ink wherein the fluid vehicle of the ink is a stable, single-phase, water-in-oil (wax) microemulsion at elevated temperatures in the range of 70° C. to 95° C., yet is a solid at ambient temperatures. The ink, since it is a microemulsion, is stable to freeze-melt cycles. The ink is suitable for jetting as a hot melt ink in conventional continuous or impulse ink jet apparatus, and can also operate in impulse thermal ink jet printheads where other hot melt ink jet ink compositions cannot.

While known compositions and processes are suitable for their intended purposes, a need remains for acoustic hot melt ink compositions suitable for thermal ink jet printing. In addition, there is a need for hot melt ink compositions which are compatible with a wide variety of plain papers. Further, there is a need for hot melt ink compositions which generate high quality, waterfast images on plain papers. There is also a need for hot melt ink jet ink compositions, which generate high quality, fast-drying images on a wide variety of plain papers at low cost, with high quality text and high quality graphics. Further, there is a need for hot melt ink jet ink compositions which exhibit minimal feathering. Additionally, there is a need for hot melt ink jet ink compositions which exhibit minimal intercolor bleed. There is also a need for hot melt ink jet ink compositions which exhibit excellent image permanence. Further, there is a need for hot melt ink jet ink compositions which are suitable for use in acoustic ink jet printing processes. Additionally, there is a need for hot ink compositions suitable for ink jet printing processes wherein the substrate is heated prior to printing and is cooled to ambient temperature, about 25° C. for example, subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate subsequent to printing is minimized, or avoided.

Reference is made to U.S. Pat. Nos. 5,688,312; 5,667,568 and 5,700,316; the disclosures of each application being incorporated herein by reference, illustrate acoustic ink compositions and processes thereof.

SUMMARY OF THE INVENTION

Examples of objects of the present invention include for example:

It is an object of the present invention to provide hot melt ink compositions with many of the advantages illustrated herein.

It is another object of the present invention to provide hot melt ink compositions suitable for acoustic ink jet printing.

It is yet another object of the present invention to provide hot melt ink compositions which are compatible with a wide variety of plain papers.

It is still another object of the present invention to provide hot melt ink compositions which generate high quality images on plain papers.

Another object of the present invention is to provide hot melt ink jet ink compositions which are comprised of a polyesterified-dye (I) or polyurethane-dye (II).

Yet another object of the present invention is to provide hot ink jet ink compositions which exhibit low viscosity of from about 1 to about 20, and 5 to 10 centipoise at a temperature of from about 125° C. to 165° C.

Still another object of the present invention is to provide hot melt ink jet ink compositions which exhibit minimal intercolor bleed.

It is another object of the present invention to provide hot melt ink jet ink compositions which exhibit excellent image permanence.

It is yet another object of the present invention to provide hot ink jet ink compositions that contain no water, and which are suitable for use in acoustic ink jet printing processes.

It is still another object of the present invention to provide hot ink compositions that contain no water and that are suitable for ink jet printing processes wherein the substrate is heated prior to printing and is cooled to ambient temperature subsequent to printing (also known as heat and delay printing processes).

Another object of the present invention is to provide ink compositions suitable for ink jet printing wherein high optical densities can be achieved with relatively low dye concentrations.

Yet another object of the present invention is to provide solvent free hot melt ink compositions suitable for ink jet printing wherein curling of the substrate subsequent to printing is minimized.

Another object of the present invention resides in the provision of hot melt inks wherein the viscosity of the ink is from about 1 centipoise to about 10 cp at, for example, the jetting temperature which can be from about 125° C. to about 180° C., and preferably about 160° C. thereby enabling excellent jetting at reasonable power levels.

Further, in another object of the present invention there are provided hot melt inks with no water and a polyesterified-dye (I) or polyurethane-dye (II).

Additionally, in another object of the present invention there are provided hot melt inks with no water or solvent for ink printing methods and apparatuses, and wherein a number of the advantages as illustrated herein are achievable.

These and other objects of the present invention in embodiments thereof can be achieved by providing an ink composition which comprises a polyesterified-dye (I) or a polyurethane-dye (II).

DETAILED DESCRIPTION OF THE INVENTION

In embodiments, the ink compositions of the present invention comprise a polyesterified-dye (I) or polyurethane-dye (II) of the formulas illustrated, and optionally a non-colored vehicle.

Examples of chromophores selected for the inks of the present invention are known and include, for example, nitroso, nitro, azo, diarylmethane, triarylmethane, xanthane, acridine, quinoline, methine, thiazole, indamine, indophenol, lactone, aminoketone, hydroxyketone, stilbene, azine, oxazine, thiazine, anthroquinone, phthalocyanine, perylenes, and the like, and wherein the weight average molecular weights thereof vary, however, they generally are in the range of from about 1,200 to about 5,000 grams/mole.

Other optional ink additives include biocides, such as Dowicil 150, 200, and 75, benzoate salts, sorbate salts, and the like, present in effective amounts, such as for example an amount of from about 0.0001 to about 4 percent by weight, and preferably from about 0.01 to about 2.0 percent by weight, pH controlling agents, such as acids, or bases, phosphate salts, carboxylate salts, sulfite salts, amine salts, and the like, present in an amount of from 0 to about 1 percent by weight and preferably from about 0.01 to about 1 percent by weight, or the like.

The inks of the present invention are particularly suitable for printing processes wherein the substrate, such as paper, transparency material, or the like, is heated during the printing process to facilitate formation of the liquid crystalline phase within the ink. Preferably, the substrate is heated to the highest temperature possible to enable the most rapid possible ink drying without damaging the substrate. When transparency substrates are employed, temperatures typically are limited to a maximum of about 100° C. to 110° C. since the polyester typically employed as the base sheet in transparency sheets tends to deform at higher temperatures. Specially formulated transparencies and paper substrates can, however, tolerate higher temperatures, frequently being suitable for exposure to temperatures of 150° C. or even 200° C. in some instances. Typical heating temperatures are from about 40° to about 140° C., and preferably from about 60° C. to about 95° C., although the temperature can be outside these ranges.

The inks of the present invention are particularly suitable for use in acoustic ink jet printing processes. In acoustic ink jet printing, reference the patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin*, Vol 16, No. 4, September 1973, pages 1168 to 1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations including (1) single ejector embodiments for raster scan printing, (2) matrix configured ejector arrays for matrix printing, and (3) several different types of pagewidth ejector arrays ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

One embodiment of the present invention is directed to a process which comprises (a) providing an acoustic ink printer having a pool of liquid ink with a free surface, and a printhead including at least one droplet ejector for radiating the free surface of the ink with focused acoustic radiation to eject individual droplets of ink therefrom on demand, said radiation being brought to focus with a finite waist diameter in a focal plane, said ink comprising water, an oil-soluble or alcohol-soluble dye, and a surfactant, the ink exhibiting a liquid microemulsion phase at a first temperature, and at a second temperature higher than the first temperature, separating into a mixture of an aqueous liquid phase and a liquid crystalline gel phase; and (b) causing droplets of said ink to be ejected onto a recording sheet in an imagewise pattern.

The polyesterified-dye (I) selected for the inks of the present invention can be prepared by reacting a functional or reactive dye such as a dye containing one or more functional groups such as, for example, a hydroxy, amine, carboxylic acid or thiol group with a diester such as dimethylterephthalate and a diol such as a poly(alkylene oxide). In embodiments, the polyesterified-dye (I) is prepared, for example, by charging a reactor, such as a 300 milliliter Parr reactor equipped with a distillation apparatus, with from about 10 to about 50 weight percent of a reactive dye, such as Reactint Black 57AB, available from Milliken Chemicals, with a mixture of from about 50 to about 90 percent by weight of equivalent mole amounts of poly(oxyalkylene), such as polyethylene oxide of molecular weight of about 200 or 400 grams per mole, and a diester, such as dimethyl isophthalate or dimethylterephthalate, a condensation catalyst, such as tin oxide or butylstannoic acid, and a diol, such as ethylene glycol. The reaction temperature is then raised to about 185° C. with stirring for a duration of about 3 hours. During this time, water is collected as a byproduct in the distillation receiver. The pressure of the reaction mixture is then reduced from atmospheric pressure to about 1 millimeter Hg, and the reaction mixture stirred for an additional 3 hours at a temperature of from about 185° C. to about 210° C., during which time the ethylene glycol is removed and collected in the distillation receiver. The mixture is then pressurized to atmospheric pressure, poured into a pan, and allowed to cool to room temperature, about 25° C.

Similarly, the polyurethane-dye (II) can be prepared by reacting a functional or reactive dye, such as a dye containing one or more functional groups such as, for example, a hydroxy, amine, a carboxylic acid or thiol group with a diisocyanate, such as tolyldiisocyanate, and a diol, such as a poly(alkylene oxide). In embodiments, the polyesterified-dye (I) is prepared, for example, by charging a reactor, such as a 300 milliliter Parr reactor equipped with from about 10 to about 50 weight percent of a reactive dye such as Reactint Black 57AB, available from Milliken Chemicals, with a mixture of from about 50 to about 90 percent by weight of equivalent mole amounts of diol, such as ethylene glycol, diethylene glycol, triethylene glycol and poly(oxyalkylene), such as polyethylene glycol of molecular weight of about 200 or 400 grams per mole, and a diisocyanate, such as tolyidiisocyanate, and a condensation catalyst, such as dibutyltin laurate. The reaction temperature is then raised to about 120° C. with stirring for a duration of from about 3 hours, after which the mixture is poured into a pan and allowed to cool to room temperature.

The functional or reactive dye selected for the preparation of the polyesterified-dye or polyurethane-dye includes Reactint Black 57AB, Reactint Black X40LV, Reactint Blue 17AB, Reactint Blue X3LV, Reactint Blue X19, Reactint Red X26B-50, Reactint Red X520, Reactint Violet X80LT, Reactint Orange X38, Reactint Yellow X15, and the like, all available from Milliken Chemicals, 1,5-(p-hydroxyphenylthio)anthraquinone, 1,8-(p-hydroxyphenylthio)-anthraquinone, 1,5-bis(p-hydroxyphenylthio)-4,8-(phenylthio)anthraquinone, 1,4-bis (p-hydroxyphenylamino)- anthraquinone, and which dye is present, for example, in an amount of from about 2 to about 20 weight percent of the ink.

The condensation catalyst utilized in the preparation of the polyesterified-dye or polyurethane-dye includes tin oxide, butylstannoic acid available from Elf Altochem as FASCAT 4100, titanium (IV) tetraisopropoxide, titanium (IV) tetrabutoxide, zinc acetate, magnesium acetate, antimony oxide, zirconium acetate, lead oxide, tetrabutyl ammonium phosphate, and unicure from UniRoyal Chemicals, mixtures thereof, and the like, and is present in an amount of from about 0.01 to 0.1 mole equivalent of the ink.

The diester utilized in the preparation of the polyesterified dye includes dimethyl terephthalate, dimethylisophthalate, dimethyl 5-sulfoisophthalate, dimethyl phthalate, dimethyl succinate, dimethyl adipate, dimethyl suberate, dimethyl fumarate, dimethyl maleate, dimethyl glutarate, mixtures thereof, and the like, and is present in an amount of from about 25 to about 50 mole percent of the product.

The diisocyanate utilized in the preparation of the polyurethane-dye includes benzene diisocyanate, toluene diisocyanate, diphenylmethane diisocyanate, 1,6-hexamethylene diisocyanate, 1,12-dodecane diisocyanate, mixtures thereof, and the like, and is present in an amount of from about 25 to about 50 mole percent of the ink.

The oxyalkylene or poly(oxyalkylene) utilized in the preparation of the polyesterified-dye or polyurethane-dye includes ethylene glycol, diethylene glycol, triethylene glycol, tetraethylene glycol, propylene glycol, dipropylene glycol, tripropylene glycol, tetrapropylene glycol, polyethylene oxide or polyethylene glycol of a molecular weight ranging from about 200 grams per mole to about 2,000 grams per mole, polypropylene oxide or polypropylene glycol of molecular weight ranging from 200 grams per mole to about 2,000 grams per mole, mixtures thereof, and the like, and which component is present in various effective amounts such as in an amount of from about 25 to about 50 mole percent of the product.

Specific embodiments of the invention will now be described in detail. These Examples are intended to be illustrative, and the invention is not limited to the materials, conditions, or process parameters set forth in these embodiments. All parts and percentages are by weight unless otherwise indicated. In these Examples, the colorant is bound to the vehicle.

EXAMPLE I

Synthesis of a black polyesterified-dye from Reactint Black 57 AB, polyethylene glycol of a molecular weight of 400 grams per mole and dimethyl terephthalate In a 1 liter Parr reactor equipped with a mechanical stirrer and distillation apparatus were charged 100 grams of Reactint Black 57AB, available from Milliken Chemicals, with 200 grams of polyethylene glycol with a molecular weight of 400 grams per mole, 115 grams of dimethyl terephthalate, 50 grams of ethylene glycol and 0.4 gram of butylstannoic acid. The resulting mixture was then heated to about 185° C. with stirring for a duration of about 3 hours. During this time, water was collected as a byproduct in the distillation receiver. The pressure of the reaction mixture was then reduced from atmospheric pressure to about 1 millimeter Hg, and the reaction mixture was stirred for an additional 3 hours at a temperature of from about 185° C. to about 210° C., during which time the ethylene glycol was removed and collected in the distillation receiver. The mixture was then pressurized to atmospheric pressure, poured into a pan, and allowed to cool to room temperature, about 25° C. throughout the Examples.

EXAMPLE II

Synthesis of a black polyesterified-dye from Reactint Black 57 AB, polyethylene glycol of a molecular weight of 600 grams per mole and dimethyl terephthalate In a 1 liter Parr reactor equipped with a mechanical stirrer and distillation apparatus were charged 100 grams of Reactint Black 57AB, available from Milliken Chemicals, with 300 grams of polyethylene glycol with a molecular weight of 600 grams per mole, 115 grams of dimethyl terephthalate, 50 grams of ethylene glycol and 0.4 gram of butyistannoic acid. The resulting mixture was then heated to about 185° C. with stirring for a duration of about 3 hours. During this time, water was collected as a byproduct in the distillation receiver. The pressure of the reaction mixture was then reduced from atmospheric pressure to about 1 millimeter Hg, and the reaction mixture stirred for an additional 3 hours at a temperature of from about 185° C. to about 210° C., during which time the ethylene glycol was removed and collected in the distillation receiver. The mixture was then pressurized to atmospheric pressure and poured into a pan and allowed to cool to room temperature.

EXAMPLE III

Synthesis of a yellow polyesterified-dye from Reactint Yellow X15, polyethylene glycol of a molecular weight of 600 grams per mole and dimethyl terephthalate In a 1 liter Parr reactor equipped with a mechanical stirrer and distillation apparatus were charged 100 grams of Reactint Yellow X15, available from Milliken Chemicals, with 300 grams of polyethylene glycol with a molecular weight of 600 grams per mole, 115 grams of dimethyl terephthalate, 50 grams of ethylene glycol and 0.4 gram of butylstannoic acid. The mixture was then heated to about 185° C. with stirring for a duration of about 3 hours. During this time, water was collected as a byproduct in the distillation receiver. The pressure of the reaction mixture was then reduced from atmospheric pressure to about 1 millimeter Hg, and the reaction mixture stirred for an additional 3 hours at a temperature of from about 185° C. to about 210° C., during which time the ethylene glycol was removed and collected in the distillation receiver. The mixture were then pressurized to atmospheric pressure, poured into a pan, and allowed to cool to room temperature.

EXAMPLE IV

Synthesis of a blue polyesterified-dye from Reactint Blue X3LV, polyethylene glycol of a molecular weight of 600 grams per mole and toluene diisocyanate In a 1 liter Parr reactor equipped with a mechanical stirrer and distillation apparatus were charged 100 grams of Reactint Blue X3LV, available from Milliken Chemicals, 300 grams of polyethylene glycol with a molecular weight of 600 grams per mole, and 90 grams of toluene diisocyanate. The mixture was then heated to about 120° C. with stirring for a duration of about 3 hours, after which the mixture was poured into a pan and allowed to cool to room temperature. The resulting ink possessed a viscosity of 8 centipoise at 160° C.

EXAMPLE V

Synthesis of a blue polyesterified-dye from Reactint Blue 17AB, polyethylene glycol of a molecular weight of 600 grams per mole and toluene diisocyanate In a 1 liter Parr reactor equipped with a mechanical stirrer and distillation apparatus were charged 100 grams of Reactint Blue 17LV, available from Milliken Chemicals, with 300 grams of polyethylene glycol with a molecular weight of 600 grams per mole, and 90 grams of toluene diisocyanate. The resulting mixture was then heated to about 120° C. with stirring for a duration of about 3 hours, after which the mixture was poured into a pan and allowed to cool to room temperature.

EXAMPLE VI

Synthesis of a red polyesterified-dye from Reactint Red X520, polyethylene glycol of a molecular weight of 600 grams per mole and toluene diisocyanate In a 1 liter Parr reactor equipped with a mechanical stirrer and distillation apparatus were charged 100 grams of Reactint Red X520, available from Milliken Chemicals, 300 grams of polyethylene glycol with a molecular weight of 600 grams per mole, and 90 grams of toluene diisocyanate. The mixture was heated to about 120° C. with stirring for a duration of about 3 hours, after which the mixture is poured into a pan and allowed to cool to room temperature.

EXAMPLE VII

Synthesis of a polyurethane 1,4-bis(p-hydroxyphenylamino)anthraquinone blue dye with a molecular weight of about 1,500 gram per mole from propylene oxide, toluene diisocyanate and 1, 4-Bis(p-hydroxyphenylamino)-anthraquinone In a 1 liter Parr reactor equipped with a mechanical stirrer and distillation apparatus were charged 200 grams of 1,4- bis(p-hydroxyphenylamino)-anthraquinone, 150 grams of propylene oxide, and 0.1 gram of butylstannoic acid. The mixture was refluxed for 3 hours at 120° C., after which 24 grams of toluene diisocyanate were added, and the mixture heated at 120° C. for an additional 3 hours. The mixture was then poured into a pan and allowed to cool to room temperature.

The inks of the above Examples can, it is believed, be selected for acoustic ink jet printing and there will result images with excellent waterfastness, acceptable optical density, and wherein the paper with the images thereon is free from curling. Also, the inks of the above Examples possess desirable viscosities, for example in the range of from about 5 to about 20 centipoise. The viscosity is measured as illustrated in the U.S. Pat. Nos. 5,688,312; 5,667,568 and 5,700,316, the disclosures of which are each totally incorporated herein by reference. Also, the present invention can include as the optional vehicle in amounts, for example, of from about 0 to about 90 weight percent the vehicles as illustrated in the aforementioned copending applications.

Other modifications of the present invention may occur to those skilled in the art subsequent to a review of the present application, and these modifications, including equivalents thereof, are intended to be included within the scope of the present invention.

What is claimed is:

1. An ink composition comprised of a polyesterified-dye (I) or polyurethane-dye (II) with a viscosity of from about 1 centipoise to about 20 centipoise at a temperature of from about 125° C. to about 165° C. and represented by the formulas

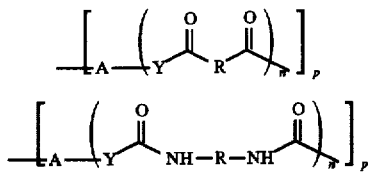

wherein A is an organic chromophore, Y is an oxyalkylene or poly(oxyalkylene), R is an arylene or alkylene, n represents the number of repeating segments, and is an integer of from about 2 to about 50, and p represents the number of chains per chromophore and is an integer of from about 1 to about 6.

2. An ink composition in accordance with claim 1 wherein the esterified-dye (I) or polyurethane-dye (II) possesses a molecular weight Mn of from about 1,200 to about 5,000 grams per mole.

3. An ink composition in accordance with claim 1 wherein the ink is a solid at a temperature of from about 20° C. to about 40° C.

4. An ink composition in accordance with claim 1 wherein the chromophore is selected from the group consisting of nitroso, nitro, azo, diarylamine, triarylamine, xanthene, acridine, quinoline, methine, thiazole, indamine, indophenol, lactone, aminoketone, hydroxyketone, stilbene, azine, oxazine, thiazine, anthraquinone, phthalocyanine, perylene, and indigoid chromophore groups.

5. An ink composition in accordance with claim 1 wherein Y is an oxy alkylene or poly(oxyalkylene) group selected from the group consisting of ethylene glycol, diethylene glycol, triethylene glycol, tetraethylene glycol, propylene glycol, dipropylene glycol, tripropylene glycol, tetrapropylene glycol, polyethylene oxide, polypropylene oxide, and polybutylene oxide.

6. An ink composition in accordance with claim 1 wherein the ink viscosity thereof is from 5 to 10 centipoise at a temperature of from about 125° C. to about 165° C.

7. An ink composition in accordance with claim 1 wherein R is phenylene, tolulene, benzylene, ethylene, propylene, butylene, pentylene, hexylene, trimethylhexylene, octylene, decylene, and dodecylene.

8. An ink composition in accordance with claim 1 wherein said chromophore is present in an amount of from about 1 to about 20 weight percent of the polyesterified-dye (I) or polyurethane-dye (II).

9. An ink composition in accordance with claim 1 wherein said chromophore is present in an amount of from about 5 to about 15 weight percent of the polyesterified-dye (I) or polyurethane-dye (II).

10. An ink composition in accordance with claim 1 wherein said chromophore is a cyan, magenta, yellow, blue, green, brown, black dye, or mixtures thereof.

11. An ink composition in accordance with claim 1 wherein the viscosity is from about 5 centipoise to about 20 centipoise at a temperature of from about 140° C. to about 160° C.

12. An ink composition in accordance with claim 1 further containing an ink vehicle.

13. An ink composition in accordance with claim 4 wherein the anthraquinone chromophore is selected from the group consisting of 1,5-(p-hydroxphenylthio)anthraquinone, 1,8-(p-hydroxphenylthio)-anthraquinone, 1,5-bis(p-hydroxyphenylthio)-4,8-(phenylthio)-anthraquinone, and 1,4-bis (p-hydroxyphenylamino)anthraquinone.

14. An ink composition in accordance with claim 1 wherein p is from about 1 to about 4.

15. An ink composition in accordance with claim 12 wherein said vehicle is an organo imide, a bisimide, an organo bisamide, a poly-(alkylene oxide)-alkylate, poly-(alkylene oxide)-dialkylate, polyoxa-alkanoic ester or a polyoxa-alkanedioic ester, organic ester, alkane, diamide, and is present in the ink in an amount of from about 0 to about 90 percent by weight.

16. An ink composition in accordance with claim 15 wherein said polyesterified-dye (I) or polyurethane-dye (II) is present in an amount of from about 10 to about 100 percent by weight.

17. An ink composition comprised of an optional vehicle, and a polyesterified-dye (I) with a viscosity of from about 1 centipoise to about 20 centipoise at a temperature of from about 125° C. to about 165° C., and represented by the formula

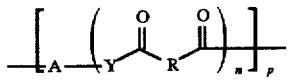

wherein A is an organic chromophore, Y is an oxyalkylene or poly(oxyalkylene), R is an arylene or alkylene, n represents the number of repeating segments and is an integer of from about 2 to about 50, and p represents the number of chains per chromophore and is an integer of from about 1 to about 6.

18. An ink composition comprised of an optional vehicle, and a polyurethane-dye (II) with a viscosity of from about 3 centipoise to about 20 centipoise at a temperature of from about 125° C. to about 165° C., and represented by the following formula

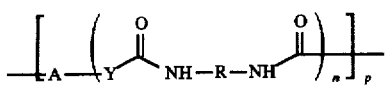

wherein A is an organic chromophore, Y is an oxyalkylene or poly (oxyalkylene), R is an arylene or alkylene, n represents the number of repeating segments and is an integer of from about 2 to about 50, and p represents the number of chains per chromophore and is an integer of from about 1 to about 6.

19. An ink composition in accordance with claim 18 wherein said optional vehicle is present, and wherein said vehicle is an organo imide, a bisimide, an organo bisamide, a poly-(alkylene oxide)-alkylate, poly-(alkylene oxide)-dialkylate, polyoxa-alkanoic ester or a polyoxa-alkanedioic ester, organic ester, and is present in the ink in an amount of from about 0 to about 90 percent by weight.

20. An ink composition in accordance with claim 1 wherein said viscosity is from about 3 to about 15.

21. An ink composition in accordance with claim 1 wherein said viscosity is from about 5 to about 10.

22. An ink composition in accordance with claim 1 wherein arylene is from about 7 to about 24 carbons, and alkylene is from about 2 to about 50 carbons.

* * * * *